United States Patent [19]

Germani

[11] Patent Number: 5,036,246

[45] Date of Patent: Jul. 30, 1991

[54] COMPENSATED DEFLECTION YOKE FOR CATHODE-RAY TUBES

[75] Inventor: Emilio Germani, Milan, Italy

[73] Assignee: Eldor S.p.A., Milan, Italy

[21] Appl. No.: 360,080

[22] Filed: Jun. 1, 1989

[30] Foreign Application Priority Data

Oct. 31, 1988 [IT] Italy ............................ 22475 A/88

[51] Int. Cl.[5] ...................... H01J 29/70; H04N 5/645

[52] U.S. Cl. ...................................... 313/440; 358/248

[58] Field of Search ................. 313/440, 456; 358/248

[56] References Cited

U.S. PATENT DOCUMENTS

| | | | |
|---|---|---|---|
| 2,428,947 | 10/1947 | Torsch | 313/440 |
| 3,939,447 | 2/1976 | D'Amato | 358/248 |
| 3,950,720 | 4/1976 | Shrader | 358/248 |
| 4,788,470 | 11/1988 | Kohzuki et al. | 313/440 |
| 4,933,596 | 6/1990 | Yoshii et al. | 313/440 |

*Primary Examiner*—Donald J. Yusko
*Assistant Examiner*—Diab Hamadi
*Attorney, Agent, or Firm*—Laff, Whitesel, Conte & Saret

[57] ABSTRACT

The inventive apparatus has two plastic supports (2) mounted, in registrer with the top and bottom sides of the yoke body (1), and crown (1*a*), in which they are structurally incorporated. Preferably, the plastic supports are rectangular with rounded edges. Each support has hooks (3) to receive the compensation coils which are snap-fitted thereon. Also, each support has pins (5) for fastening the coil terminals 4*a*, 4*b*. The pins also support a damping cell when required. The cell includes a registor (6) connected in series with a capacitor (7). The compensation coils (4) can have a variable number of turns, depending upon the compensation which it is to achieve.

4 Claims, 1 Drawing Sheet

COMPENSATED DEFLECTION YOKE FOR CATHODE-RAY TUBES

FIELD AND BACKGROUND OF THE INVENTION

The present invention relates to a compensated deflection yoke for cathode-ray tubes.

It is known that in the field of television sets and monitors in general the necessity arises to reduce the electromagnetic radiation produced by the horizontal windings of the deflection yokes. In order to reduce said radiation, coils, named bucking coils, are suitably arranged to the sides of the yoke body located at the rear end of the cathode-ray tube.

A great difficulty is encountered on mounting said coils, as they must be fixedly secured to the yoke body, in a suitable manner with respect to the electromagnetic field on which it is wished to operate and must be properly clamped.

At the present state of the art some monitor manufacturers have studied a compensating system provided with a bucking coil consisting of some turns of copper wire wound in the air, held together by some turns of insulating tape and fastened to the yoke partly by welding the terminals thereof to the yoke contacts and partly by means of silicone cements.

However this structure is rather precarious and not at all reliable as regards lifetime and efficiency.

Likewise there are some embodiments of handicraft type which generally exhibit the same structure as the one described above.

From the foregoing it appears that compensation cannot be a fine one and that the structure reliability of the coil is limited because said coil is not integrally fastened to the yoke body to which it belongs, but it is only secured through the terminals thereof, Finally, when fastening is carried out by means of cements it is not very reliable because the coil can be easily removed from its seat, which is already precarious by itself, when the monitor is subjected to sudden and strong shakes.

It is also to be pointed out that in such a precarious embodiment the calculus of compensation relating to the number of turns in bucking coils surely cannot be of high quality.

It is therefore an object of the present invention to find a solution which is capable of associating a reliability in use with a quick installation and high quality of yield.

SUMMARY OF THE INVENTION

The foregoing and further objects which will best be understood from the following description, are attained in accordance with the present invention by a compensated deflection yoke for cathode-ray tubes comprising a yoke body the circular base portion of which, relating to the plastic magnet-holding ring, circumferentially incorporates two plastic supports, preferably of polygonal form with rounded edges, mounted to the north and south sides of the yoke and at right angles to the plane of the latter, provided each with hooks disposed at right angles on the symmetric ends of said supports and designed to snap-fit bucking coils, as well as with plastic pins so disposed that they project with respect to said supports and are designed to secure the coil terminals, said pins being also able to support, when necessary, a dampening cell consisting of a resistor connected in series to a capacitor, said bucking coils being also intended to have a variable number of turns.

BRIEF DESCRIPTION OF THE DRAWINGS

Further features and advantages of the invention will become more apparent from the detailed description of a preferred embodiment of a compensated deflection yoke for cathode-ray tubes given hereinafter by way of non-limiting example with reference to the accompanying drawings, in which.

DESCRIPTION OF THE PREFERRED EMBODIMENT

Figure 1:
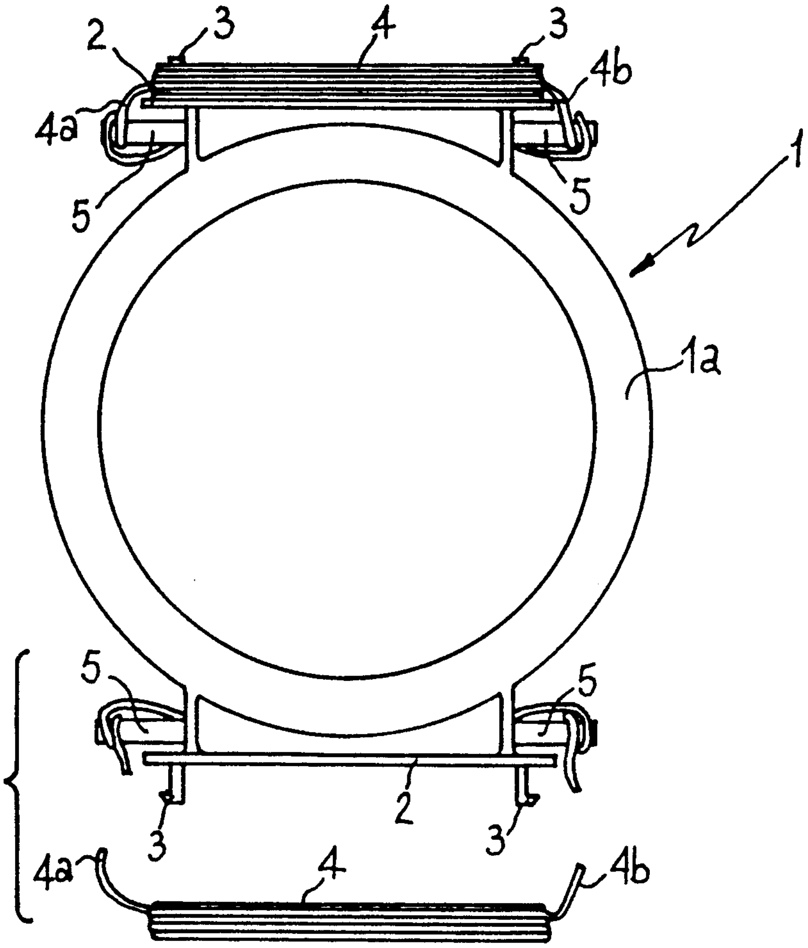
FIG. 1 is a simplified plan view of the yoke in which the magnet-holding ring is provided with the plastic supports for the respective bucking coils in accordance with the invention.

Referring to the drawings and particularly to FIG. 1, 1 denotes the yoke body taken as a whole, and 1*a* a magnet-holding ring mounted to the widest circular portion of the yoke body 1.

Symmetrically to the magnet-holding ring and in register with the top and bottom sides of yoke 1, are two plastic supports shown in top view in the figure and identified by reference numeral 2.

Said plastic supports are provided with hooks 3 around which coils 4 can be wound. The ends 4*a* and 4*b* of said coils are fastened to pins 5 which, as more clearly shown in FIG. 2, are designed to support a dampening cell as well which consists of a resistor 6 connected in series to a capacitor 7.

Figure 2:
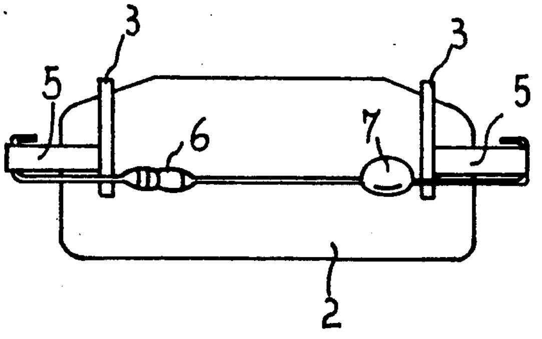
FIG. 2 is a front view of the plastic support provided with the dampening cell of the invention.

According to this embodiment preferably the plastic support is in the form of a polygon with rounded edges, such as a rectangular form which clearly seen in FIG. 2. The plastic support 2 is disposed at right angles to the plane of the magnet-holding ring 1*a* of yoke 1 and symmetrically in register with the north and south sides of said yoke.

Obviously the perpendicular condition with respect to the plane of magnet-holding ring 1*a* is not compulsory, but if a necessity of electromagnetic nature for the compensation arises, said supports can be positioned during assembly at a variable angle relating to said plane and can also have different suitably shaped forms in order to optimize the required compensation.

Operation of the yoke according to the invention described above mainly as regards structure, is as follows.

Yoke body 1, provided with plastic supports 2, is equipped with bucking coils 4 which are connected in parallel to each other and then in series with the horizontal winding of the yoke or in any other manner.

Bucking coils 4, as well as the horizontal deflection ones, are made of self-cementing copper wire and are wound by an appropriate winding machine around a former intended for the purpose. For the above reasons they do not need wound around bands to ensure the cohesion of wires and therefore their arrangement on the structure of the yoke body 1, and as a result on the plastic supports 2, is surely rigid and very reliable against any impact or shake.

The number of turns in the bucking coils obviously depends on the number of turns in the horizontal deflection coils and the degree of compensation it is wished to attain.

The two pins to which terminals 4*a* and 4*b* of bucking coil 4 are fastened also allow a dampening cell to be added each time it is necessary, said cell consisting of a resistor connected in series to a capacitor, to resist the parasitic oscillations generated by the bucking coil.

The invention attains the intended purposes.

In fact, the present yokes used for cathode-ray tubes exhibit a low radiated electromagnetic field intensity which is just reached by virtue of the use of bucking coils 4 directly mounted to the yoke body 1 on the above described plastic supports 2 which are incorporated in the circular base portion of yoke 1 representing the plastic magnet-holding ring 1*a*.

Furthermore, the compensation of electromagnetic radiations by the above solution has other particular characterizing features which can be summarized as follows:

1. an excellently-brought about mechanical mounting which allows an important saving as regards manual activity;

2. the rigidity of the wires which are also fastened to precise locations so as to eliminate excessive magnetic leakages;

3. a compact and net wiring which reduces the bulkiness of the compensated yoke to a minimum as well as all risks of entangling the connection wires being part of the monitor during the introduction of the yoke.

It is therefore possible to assume that, unlike handicraft-made coils which must be manufactured one by one and then set in position and stuck in a suitable seat, the present bucking coils allow an important saving in manufacture and ensure a high production rate as compared to any other type of embodiment.

Obviously, further modifications are possible as regards structure and parameters, all falling within the scope of the inventive idea.

What is claimed is:

1. A compensated deflection yoke for cathode-ray tubes comprising a yoke body having horizontal coils mounted on plastic supports said horizontal coils emitting a stray field, said yolk body having a base which relates to a plastic crown circumferentially incorporating two compensation coils for emitting a compensating field which is opposite to the stray field emitted by the deflection yoke horizontal coils, said plastic supports having a, polygonal form with rounded edges and being mounted onto the top and bottom sides of the yoke and at right angles to a plane of the yoke, each of said plastic supports being provided with hooks extending at right angles and on symmetric ends of said supports and being designed to receive with snap-fit the compensation coils, plastic pins disposed so that they project with respect to said supports to secure terminals of the coil, said pins being also able to support a damping cell having a resistor connected in series with a capacitor, said compensation coils having a variable number of turns, and being coupled together and to the horizontal coils of the deflection yoke.

2. The compensated deflection yoke for cathode-ray tubes as claimed in claim 1, wherein said plastic supports have a form which enable them to be positioned at a variable angle relative to the plane of said yoke body, depending upon the compensation to achieve.

3. The compensated deflection yoke for cathode-ray tubes as claimed in claim 1, wherein said plastic supports are a rectangular form depending upon the compensating effect to be obtained from the coils.

4. The compensated deflection yoke for cathode-ray tubes as claimed in claim 1, wherein said compensating coils are made of self-cementing copper wire.

* * * * *